(12) United States Patent
Nakamura et al.

(10) Patent No.: US 12,738,611 B2
(45) Date of Patent: Sep. 15, 2026

(54) ENERGY STORAGE DEVICE

(71) Applicant: GS Yuasa International Ltd., Kyoto (JP)

(72) Inventors: Jun Nakamura, Kyoto (JP); Akio Kawai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 697 days.

(21) Appl. No.: 17/924,460

(22) PCT Filed: May 13, 2021

(86) PCT No.: PCT/JP2021/018261
§ 371 (c)(1),
(2) Date: Nov. 10, 2022

(87) PCT Pub. No.: WO2021/230329
PCT Pub. Date: Nov. 18, 2021

(65) Prior Publication Data
US 2023/0187794 A1 Jun. 15, 2023

(30) Foreign Application Priority Data
May 14, 2020 (JP) ................................ 2020-085266

(51) Int. Cl.
*H01M 50/564* (2021.01)
*H01M 50/176* (2021.01)
(Continued)

(52) U.S. Cl.
CPC ....... *H01M 50/564* (2021.01); *H01M 50/176* (2021.01); *H01M 50/55* (2021.01);
(Continued)

(58) Field of Classification Search
None
See application file for complete search history.

(56) References Cited

U.S. PATENT DOCUMENTS

2011/0244309 A1 10/2011 Byun et al.
2012/0148908 A1 6/2012 Ito
(Continued)

FOREIGN PATENT DOCUMENTS

EP 3451408 A1 3/2019
JP 2005-285406 A 10/2005
(Continued)

OTHER PUBLICATIONS

De Luccia, "The corrosion of aging aircraft and its consequences." 32nd Structures, Structural Dynamics, and Materials Conference , 1991 (Year: 1991).*
(Continued)

*Primary Examiner* — Niki Bakhtiari
*Assistant Examiner* — James A Corno
(74) *Attorney, Agent, or Firm* — McGinn IP Law Group, PLLC

(57) ABSTRACT

An energy storage device includes an electrode assembly, a case that houses the electrode assembly, and a metal external terminal disposed in the case, wherein the external terminal includes a flange portion spreading along the case outside the case and a shaft portion extending from the flange portion and penetrating the case, the flange portion is formed of a clad material including a plurality of metal layers stacked in a penetrating direction of the shaft portion, and includes a through hole through which the shaft portion is inserted.

18 Claims, 12 Drawing Sheets

(51) Int. Cl.

| | |
|---|---|
| ***H01M 50/55*** | (2021.01) |
| ***H01M 50/553*** | (2021.01) |
| ***H01M 50/557*** | (2021.01) |
| ***H01M 50/562*** | (2021.01) |

(52) U.S. Cl.

CPC ....... *H01M 50/553* (2021.01); *H01M 50/557* (2021.01); *H01M 50/562* (2021.01)

(56) References Cited

U.S. PATENT DOCUMENTS

| | | | | |
|---|---|---|---|---|
| 2012/0148911 | A1 | 6/2012 | Suzuki et al. | |
| 2013/0224536 | A1 | 8/2013 | Hattori et al. | |
| 2014/0242439 | A1* | 8/2014 | Hattori | H01M 50/147 429/121 |
| 2014/0242440 | A1* | 8/2014 | Yamada | H01M 50/176 429/121 |
| 2015/0086844 | A1 | 3/2015 | Masuda | |
| 2016/0043353 | A1 | 2/2016 | Tsutsumi et al. | |
| 2016/0254517 | A1* | 9/2016 | Tsunaki | H01M 50/176 429/179 |
| 2017/0214030 | A1 | 7/2017 | Tsutsumi et al. | |
| 2018/0183018 | A1 | 6/2018 | Maeda et al. | |
| 2018/0358605 | A1 | 12/2018 | Li et al. | |
| 2019/0067650 | A1 | 2/2019 | Li et al. | |
| 2019/0189995 | A1 | 6/2019 | Nemoto et al. | |
| 2020/0168860 | A1 | 5/2020 | Enomoto et al. | |
| 2020/0358071 | A1 | 11/2020 | Kawanishi | |
| 2021/0305647 | A1 | 9/2021 | Wakimoto et al. | |
| 2023/0178788 | A1 | 6/2023 | Li et al. | |

FOREIGN PATENT DOCUMENTS

| | | | |
|---|---|---|---|
| JP | 2009-259524 | A | 11/2009 |
| JP | 2010-033766 | A | 2/2010 |
| JP | 2011-210725 | A | 10/2011 |
| JP | 2012-109284 | A | 6/2012 |
| JP | 2012-124132 | A | 6/2012 |
| JP | 2012-138342 | A | 7/2012 |
| JP | 2013-182724 | A | 9/2013 |
| JP | 2014-165155 | A | 9/2014 |
| JP | 2014-167846 | A | 9/2014 |
| JP | WO 2015/059826 | A1 | 4/2015 |
| JP | 2015-088464 | A | 5/2015 |
| JP | 2016-192322 | A | 11/2016 |
| JP | 2017-130386 | A | 7/2017 |
| JP | 2017-201629 | A | 11/2017 |
| JP | 2018-081860 | A | 5/2018 |
| JP | 2018-107122 | A | 7/2018 |
| JP | 2018-152224 | A | 9/2018 |
| JP | 2018-537829 | A | 12/2018 |
| JP | 2019-075214 | A | 5/2019 |
| JP | 2019-075308 | A | 5/2019 |
| JP | 2019-109972 | A | 7/2019 |
| WO | WO 2014/157191 | A1 | 10/2014 |
| WO | WO 2018/056345 | A1 | 3/2018 |

OTHER PUBLICATIONS

Heebink, "Moisture-excluding effectiveness of edge seals for aircraft sandwich panels", Report 1822, U.S. Dept. of Agriculture, Forest Service, Forest Products Laboratory, Mar. 1956 (Year: 1956).*

International Search Report (ISR) (PCT Form PCT/ISA/210), in PCT/JP2021/018261, dated Aug. 10, 2021.

* cited by examiner

ENERGY STORAGE DEVICE

TECHNICAL FIELD

The present invention relates to an energy storage device including an external terminal.

BACKGROUND ART

Conventionally, a lithium ion secondary battery including an external terminal constituted by a plurality of members has been known (see Patent Document 1). In this lithium ion secondary battery, as shown in FIG. 12, in an external terminal 100, a shaft portion 101 and a flange portion 102 which spreads from the shaft portion 101 and to which another member such as a bus bar is welded are formed of different members. The shaft portion 101 and the flange portion 102 are connected by swaging.

In the external terminal 100 in which the shaft portion 101 and the flange portion 102 are formed of different members, a clad material in which a plurality of metal layers are stacked on the flange portion 102 may be used depending on a material of a member such as a bus bar welded to the flange portion 102.

In the external terminal 100, an end portion of the shaft portion 101 is inserted through a through hole provided in the flange portion 102, and the inserted end portion is swaged and spreads along the flange portion 102, whereby the flange portion 102 and the shaft portion 101 are connected. At the time of this swaging, a hole peripheral edge portion of a metal layer constituting a surface (surface opposite to the case side) of the flange portion 102 is compressed and tends to extend in a direction away from the through hole; however, since the metal layer is secured to the adjacent metal layer, the compressed portion cannot extend, so that when the end portion of the shaft portion 101 is swaged and spreads, a periphery of the swaged portion swells.

When such swelling occurs on the surface of the flange portion 102, it may be difficult to connect other members due to the swelling when a member such as a bus bar is connected.

PRIOR ART DOCUMENT

Patent Document

Patent Document 1: JP-A-2009-259524

SUMMARY OF THE INVENTION

Problems to be Solved by the Invention

In view of the above, an object of the present embodiment is to provide an energy storage device in which other members are easily connected to a flange portion of an external terminal even when swelling caused by swaging occurs around a swaged portion in the flange portion.

Means for Solving the Problems

An energy storage device according to the present embodiment includes: an electrode assembly; a case that houses the electrode assembly; and a metal external terminal disposed in the case, wherein the external terminal includes a flange portion spreading along the case outside the case; and a shaft portion extending from the flange portion, penetrating the case, and conductively connected to the electrode assembly, the flange portion is formed of a clad material including a plurality of metal layers stacked in a penetrating direction of the shaft portion, and includes a through hole through which the shaft portion is inserted, the shaft portion includes an enlarged diameter portion spreading along a surface of the flange portion on a case side, and a swaged portion that spreads along a surface of the flange portion on a side opposite to the case and sandwiches a peripheral edge portion of the through hole in the flange portion between the swaged portion and the enlarged diameter portion, and a first metal layer that is a metal layer at an end opposite to the case in the penetrating direction among the plurality of metal layers includes a concave part recessed in the penetrating direction or a through hole penetrating in the penetrating direction in a region that is larger than the swaged portion when viewed from the penetrating direction and includes the swaged portion when viewed from the penetrating direction.

MODE FOR CARRYING OUT THE INVENTION

Figure 1:
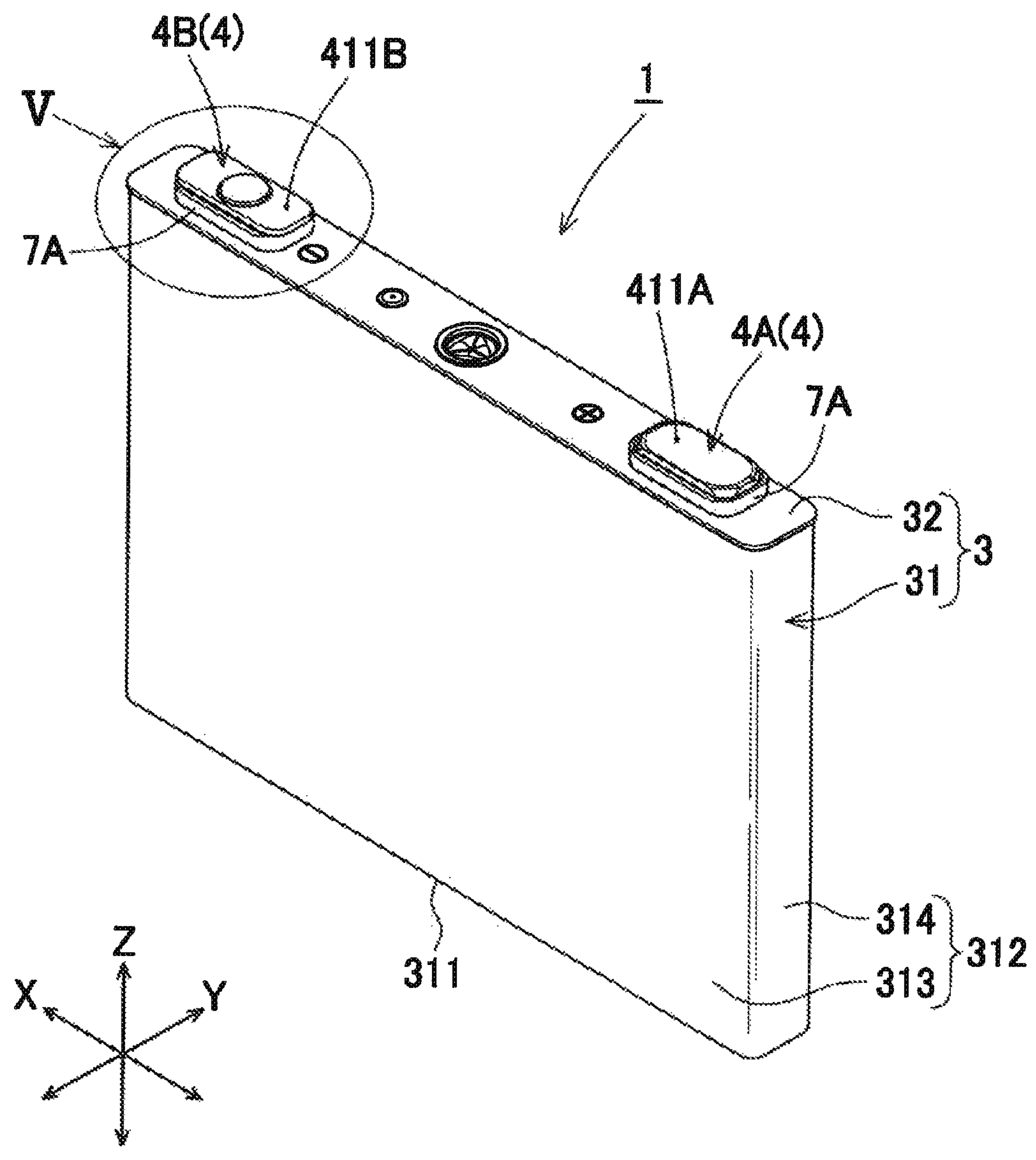
FIG. 1 is a perspective view of an energy storage device according to the present embodiment.

An energy storage device according to the present embodiment includes an electrode assembly, a case that houses the electrode assembly, and a metal external terminal disposed in the case, wherein the external terminal includes a flange portion spreading along the case outside the case, and a shaft portion extending from the flange portion, penetrating the case, and conductively connected to the electrode assembly, the flange portion is formed of a clad material including a plurality of metal layers stacked in a penetrating direction of the shaft portion, and includes a through hole through which the shaft portion is inserted, the shaft portion includes an enlarged diameter portion spreading along a surface of the flange portion on a case side, and a swaged portion that spreads along a surface of the flange portion on a side opposite to the case and sandwiches a peripheral edge portion of the through hole in the flange portion between the swaged portion and the enlarged diameter portion, and a first metal layer that is a metal layer at an end opposite to the case in the penetrating direction among the plurality of metal layers includes a concave part recessed in the penetrating direction or a through hole penetrating in the penetrating direction in a region that is larger than the swaged portion when viewed from the penetrating direction and includes the swaged portion when viewed from the penetrating direction.

According to such a configuration, even if a convex part caused by swaging is formed around the swaged portion on the surface of the flange portion on the side opposite to the case, since a position of the swaged portion on the surface of the flange portion and its periphery are recessed, when another member is connected to the flange portion, the convex part does not interfere, and the connection is easy.

In the energy storage device, the flange portion may include two metal layers that are the first metal layer and a second metal layer that is a metal layer at an end on the case side in the penetrating direction among the plurality of metal layers, and electrical resistance of a metal forming the second metal layer may be smaller than electrical resistance of a metal forming the first metal layer.

According to such a configuration, as compared with a case where the first metal layer has a uniform thickness, the electrical resistance between the second metal layer and the enlarged diameter portion is suppressed, whereby conductivity between the shaft portion and the flange portion is improved.

An energy storage device according to the present embodiment includes an electrode assembly, a case that houses the electrode assembly, and a metal external terminal disposed in the case, wherein the external terminal includes a flange portion spreading along an outer surface of the case outside the case, and a shaft portion extending from the flange portion, penetrating the case, and conductively connected to the electrode assembly, the flange portion is formed of a clad material including a plurality of metal layers stacked in a penetrating direction of the shaft portion, and includes a through hole through which the shaft portion is inserted, the shaft portion includes an enlarged diameter portion that is formed between the flange portion and the outer surface of the case and spreads along the outer surface of the case, and a swaged portion that spreads along a surface of the flange portion on a side opposite to the case and sandwiches a peripheral edge portion of the through hole in the flange portion between the swaged portion and the enlarged diameter portion, and a first metal layer that is a metal layer opposite to the case in the penetrating direction among the plurality of metal layers includes a concave part recessed in the penetrating direction or a through hole penetrating in the penetrating direction in a region that is larger than the swaged portion when viewed from the penetrating direction and includes the swaged portion when viewed from the penetrating direction.

According to such a configuration, even if a convex part caused by swaging is formed around the swaged portion on the surface of the flange portion on the side opposite to the case, since a position of the swaged portion on the surface of the flange portion and its periphery are recessed, when another member is connected to the flange portion, the convex part does not interfere, and the connection is easy.

The flange portion may include two metal layers that are the first metal layer and a second metal layer which is a metal layer facing the case in the penetrating direction among the plurality of metal layers, and electrical resistance of a metal forming the second metal layer may be smaller than electrical resistance of a metal forming the first metal layer.

According to such a configuration, as compared with a case where the first metal layer has a uniform thickness, the electrical resistance between the second metal layer and the enlarged diameter portion is suppressed, whereby conductivity between the shaft portion and the flange portion is improved.

The flange portion may include a convex part protruding in the penetrating direction in the concave part of the first metal layer, and the convex part may be disposed between a peripheral edge of the concave part and a peripheral edge of the swaged portion in a direction orthogonal to the penetrating direction.

According to such a configuration, another member is easily connected to the flange portion.

The first metal layer may have the through hole, the flange portion may include a convex part protruding in the penetrating direction, and the convex part may be disposed between a peripheral edge of the through hole and a peripheral edge of the swaged portion in a direction orthogonal to the penetrating direction.

According to such a configuration, another member is easily connected to the flange portion.

The second metal layer may include a peripheral end surface that is an end surface in the direction orthogonal to the penetrating direction, and the first metal layer may include a cover portion protruding in the penetrating direction, the cover portion protruding along the peripheral end surface of the second metal layer.

The external terminal may be a negative electrode, the first metal layer may contain aluminum or an aluminum-based metal, and the second metal layer may contain copper or a copper-based metal.

As described above, according to the present embodiment, it is possible to provide the energy storage device in which other members are easily connected to the flange portion of the external terminal even when swelling caused by swaging occurs around the swaged portion in the flange portion.

Hereinafter, an embodiment of the present invention will be described with reference to FIGS. 1 to 9. Names of constituent members (constituent elements) according to the present embodiment are effective in the present embodiment, and can be different from names of constituent members (constituent elements) according to the background art.

The energy storage device of the present embodiment is a nonaqueous electrolyte secondary battery. More specifically, the energy storage device is a lithium ion secondary battery utilizing electron transfer occurring with the movement of lithium ions. This type of energy storage device supplies electric energy. A single or a plurality of energy storage devices are used. Specifically, when the required output and the required voltage are small, the energy storage device is used alone. On the other hand, when at least one of the required output and the required voltage is large, the energy storage device is used for an energy storage apparatus in combination with another energy storage device. In the energy storage apparatus, the energy storage device used for the energy storage apparatus supplies electric energy.

Figure 2:
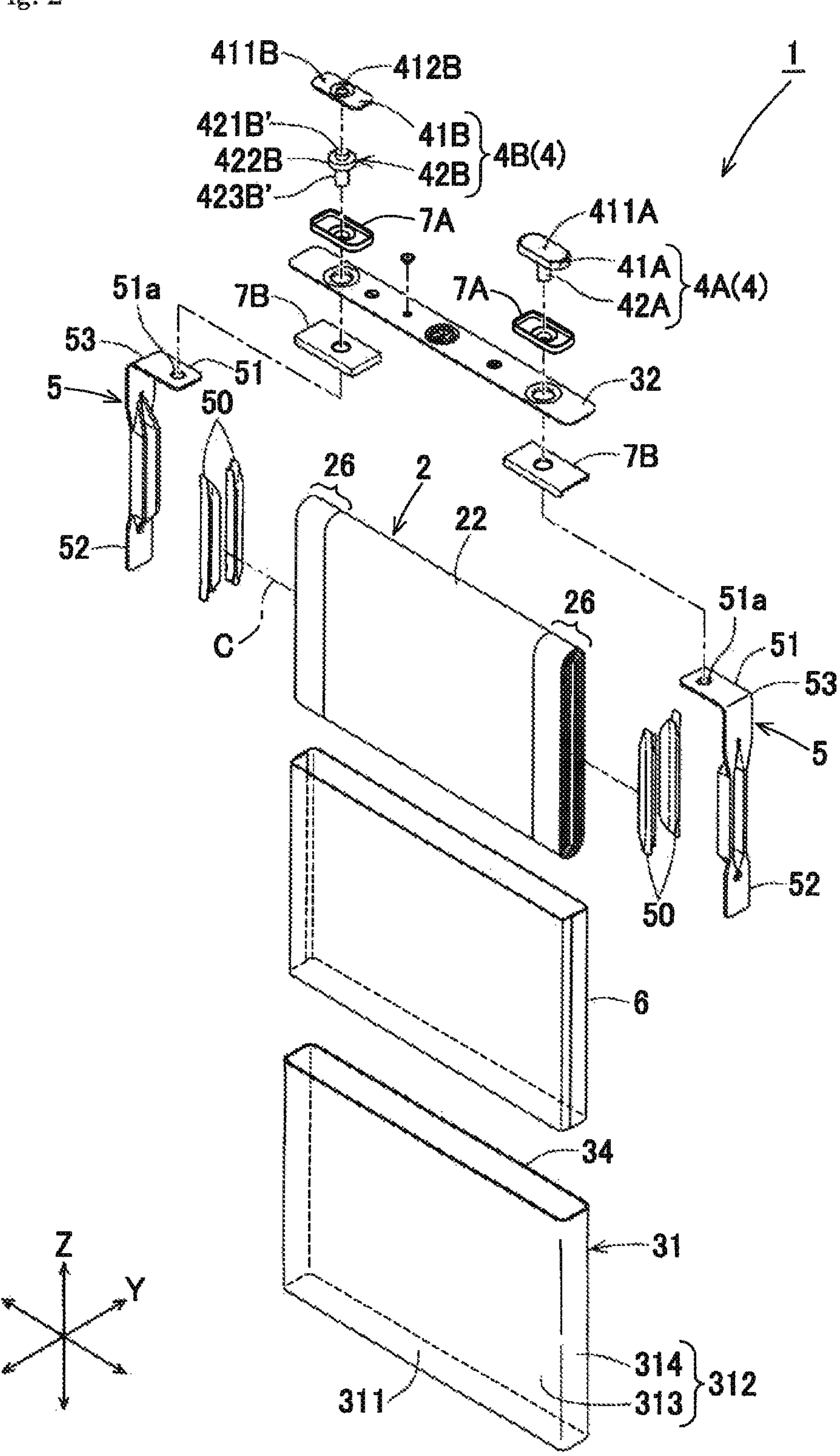
FIG. 2 is an exploded perspective view of the energy storage device.

As shown in FIGS. 1 and 2, the energy storage device includes an electrode assembly 2, a case 3 that houses the electrode assembly 2, and a metal external terminal 4 disposed in the case 3. The energy storage device 1 also includes a current collector 5 conductively connecting the electrode assembly 2 and the external terminal 4, an insulating member 6 disposed between the electrode assembly 2 and the case 3, and the like. The external terminal 4 (to be more specific, a negative electrode shaft portion 42B of a negative electrode terminal 4B) shown in FIG. 2 has a shape before being swaged.

Figure 3:
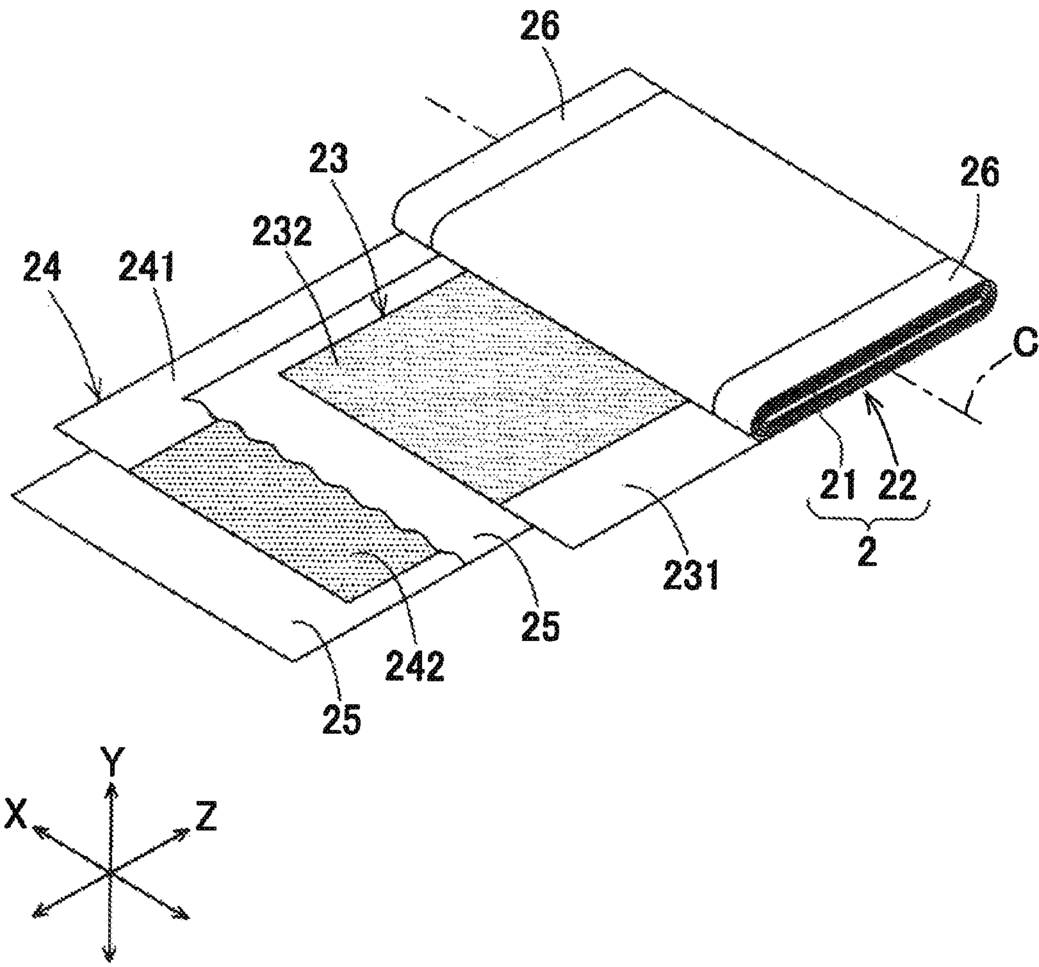
FIG. 3 is a view for explaining a configuration of an electrode assembly provided in the energy storage device.

As also shown in FIG. 3, the electrode assembly 2 includes wound electrodes (a positive electrode 23 and a negative electrode 24). Specifically, the electrode assembly 2 includes a winding core 21 and a layered product 22 formed of an electrode wound around the winding core 21. In the layered product 22, the positive electrode 23 and the negative electrode 24 are stacked in a state of being insulated from each other. In the electrode assembly 2, lithium ions move between the positive electrode 23 and the negative electrode 24, whereby the energy storage device 1 is charged and discharged.

The positive electrode 23 includes a strip-shaped metal foil 231 and a positive active material layer 232 that is overlaid on the metal foil 231. The positive active material layer 232 is overlaid on the metal foil 231 in a state where one end edge portion (uncovered portion) of the metal foil 231 in a width direction is exposed. The metal foil 231 of the present embodiment is, for example, an aluminum foil.

The negative electrode 24 includes a strip-shaped metal foil 241 and a negative active material layer 242 that is overlaid on the metal foil 241. The negative active material layer 242 is overlaid on the metal foil 241 in a state where the other (the side opposite to the uncovered portion of the metal foil 231 of the positive electrode 23) end edge portion (uncovered portion) of the metal foil 241 in the width direction is exposed. The metal foil 241 of the present embodiment is, for example, a copper foil.

In the electrode assembly 2 of the present embodiment, the positive electrode 23 and the negative electrode 24 are wound in a state of being insulated from each other by the separator 25. That is, in the layered product 22 of the present embodiment, the positive electrode 23, the negative electrode 24, and the separator 25 are stacked.

The separator 25 is an insulating member and is disposed between the positive electrode 23 and the negative electrode 24. Thereby, in the electrode assembly 2 (specifically, the layered product 22), the positive electrode 23 and the negative electrode 24 are insulated from each other. The separator 25 holds an electrolyte solution in the case 3. Thus, during charge and discharge of the energy storage device 1, lithium ions can move between the positive electrode 23 and the negative electrode 24 alternately stacked with the separator 25 interposed between the electrodes.

The separator 25 has a strip shape, and is formed of, for example, a porous film of polyethylene, polypropylene, cellulose, polyamide, or the like. The separator 25 of the present embodiment includes a substrate formed of a porous film and an inorganic layer provided on the substrate. The inorganic layer contains inorganic particles such as SiO2 particles, Al2O3 particles, and boehmite (alumina hydrate). The substrate is formed of, for example, polyethylene.

The dimension of the separator 25 in the width direction is larger than the width of the negative active material layer 242. The separator 25 is disposed between the positive electrode 23 and the negative electrode 24, which are stacked and staggered in the width direction in such a manner that the positive active material layer 232 and the negative active material layer 242 overlap each other in a thickness direction (stacking direction). At this time, the uncovered portion of the positive electrode 23 and the uncovered portion of the negative electrode 24 do not overlap each other. That is, the uncovered portion of the positive electrode 23 protrudes in the width direction (direction orthogonal to the stacking direction) from the region where the positive electrode 23 and the negative electrode 24 overlap each other, and the uncovered portion of the negative electrode 24 protrudes in the width direction (direction opposite to a protruding direction of the uncovered portion of the positive electrode 23) from the region where the positive electrode 23 and the negative electrode 24 overlap each other. The electrode assembly 2 is formed by winding the positive electrode 23, the negative electrode 24, and the separator 25 around the winding core 21 so as to obtain such a stacked state (relative position). In the electrode assembly 2 of the present embodiment, the uncovered stacked portion 26 of the electrode assembly 2 is formed of a portion where only the uncovered portion of the positive electrode 23 or the uncovered portion of the negative electrode 24 is stacked.

The uncovered stacked portion 26 is provided at each electrode of the electrode assembly 2. That is, the uncovered stacked portion 26 in which only the uncovered portion of the positive electrode 23 is stacked forms an uncovered stacked portion of the positive electrode in the electrode assembly 2, and the uncovered stacked portion 26 in which only the uncovered portion of the negative electrode 24 is stacked forms an uncovered stacked portion of the negative electrode in the electrode assembly 2.

The case 3 houses an electrolyte solution together with the electrode assembly 2. Specifically, the case 3 includes a case body 31 having an opening, and a lid plate 32 blocking (closing) the opening of the case body 31. The case 3 is formed of a metal having resistance to the electrolyte solution. The case 3 of the present embodiment is formed of, for example, aluminum or an aluminum-based metal such as an aluminum alloy The electrolyte solution is a nonaqueous electrolyte solution. The electrolyte solution is obtained by dissolving an electrolyte salt in an organic solvent. Examples of organic solvents include cyclic carbonates, such as propylene carbonate and ethylene carbonate, and linear carbonates, such as dimethyl carbonate, diethyl carbonate, and ethyl methyl carbonate. The electrolyte salt is $LiClO_4$, $LiBF_4$, $LiPF_6$ or the like. The electrolyte solution of the present embodiment is obtained by dissolving 1 mol/L of $LiPF_6$ in a mixed solvent prepared by mixing ethylene carbonate, dimethyl carbonate, and ethyl methyl carbonate at a ratio of ethylene carbonate:dimethyl carbonate:ethyl methyl carbonate=3:2:5.

The case body 31 includes a plate-shaped blocking portion 311 and a cylindrical body portion (peripheral wall) 312 connected to a peripheral edge of the blocking portion 311.

The blocking portion 311 is a portion located at a lower end of the case body 31 when the case body 31 is disposed in a posture in which the opening faces upward (that is, the portion serves as a bottom wall of the case body 31 when the opening faces upward). The blocking portion 311 has a rectangular shape when viewed from a normal direction of the blocking portion 311. Hereinafter, a long side direction of the blocking portion 311 is defined as an X axis of an orthogonal coordinate system, a short side direction of the blocking portion 311 is defined as a Y axis of the orthogonal coordinate system, and the normal direction of the blocking portion 311 is defined as a Z axis of the orthogonal coordinate system.

The body portion 312 has a rectangular tube shape, more specifically, a flat rectangular tube shape. The body portion 312 includes a pair of long wall portions 313 extending from the long side at the peripheral edge of the blocking portion 311 and a pair of short wall portions 314 extending from the short side at the peripheral edge of the blocking portion 311. That is, the pair of long wall portions 313 face each other with an interval (specifically, an interval corresponding to the short side at the peripheral edge of the blocking portion 311) in the Y axis direction, and the pair of short wall portions 314 face each other with an interval (specifically, an interval corresponding to the long side at the peripheral edge of the blocking portion 311) in the X axis direction. The short wall portions 314 connect corresponding (specifically, facing in the Y axis direction) end portions of the pair of long wall portions 313 to each other, thereby forming the body portion 312 having a rectangular tube shape.

As described above, the case body 31 has a rectangular tube shape (that is, a bottomed rectangular tube shape) in which one end portion in an opening direction (Z axis direction) is closed. The electrode assembly 2 is housed in the case body 31 in a state where a winding center axis C direction is directed to the X axis direction.

The lid plate 32 is a plate-shaped member that closes the opening of the case body 31. The lid plate 32 of the present embodiment is a rectangular plate member that is long in the X axis direction as viewed in the Z axis direction. In the lid plate 32, a peripheral edge portion of the lid plate 32 is overlaid on an opening peripheral edge portion 34 of the case body 31 so as to close the opening of the case body 31. In the state where the lid plate 32 is overlaid on the opening peripheral edge portion 34, a boundary portion between the lid plate 32 and the case body 31 is welded, whereby the case 3 is formed.

The external terminal 4 is a portion of the energy storage device 1 which is electrically connected to an external terminal of another energy storage device, an external device, or the like. The external terminal 4 is formed of a conductive member. The energy storage device 1 of the present embodiment includes two types of the external terminals 4 that are a positive electrode terminal 4A and a negative electrode terminal 4B. These two external terminals 4 are arranged in the case 3 at positions spaced in the X axis direction, more specifically, at each end portion position of the case 3 in the X axis direction in a state where portions 42A and 42B thereof penetrate the case 3.

In the energy storage device 1 of the present embodiment, insulating members 7A and 7B are arranged between the external terminal 4 and the case 3 and between the case 3 and the current collector 5. The insulating member 7A insulates the external terminal 4 from the case 3 (in the example of the present embodiment, the lid plate 32), and seals between the portions 42A and 42B of the external terminal 4, which penetrate the case 3, and the case 3. The insulating member 7B insulates the case 3 (in the example of the present embodiment, the lid plate 32) from the current collector 5.

Figure 4:
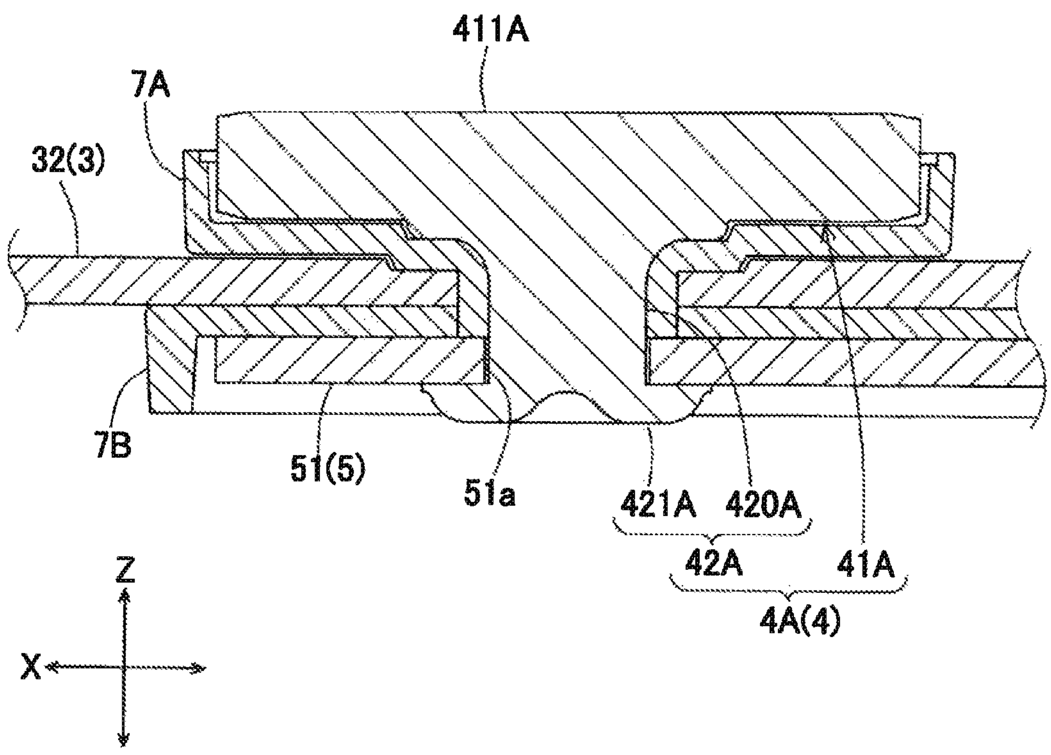
FIG. 4 is an enlarged cross-sectional view of a positive electrode terminal of the energy storage device and its periphery.
Figure 5:
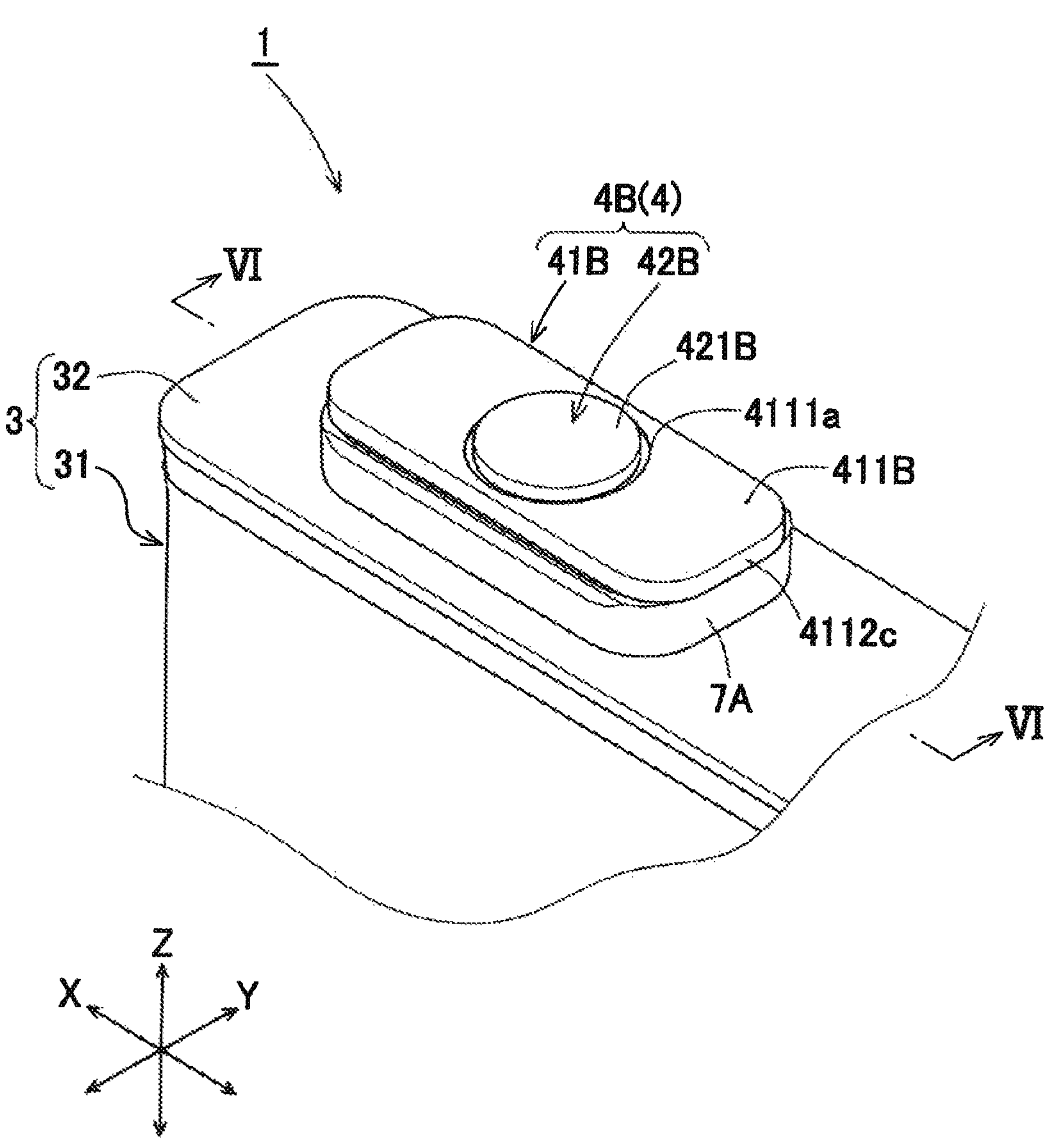
FIG. 5 is an enlarged view of a portion indicated by V in FIG. 1.

As also shown in FIG. 4, the positive electrode terminal 4A includes a positive electrode flange portion 41A that spreads along the case 3 outside the case 3, and a positive electrode shaft portion 42A that extends from the positive electrode flange portion 41A, penetrates the case 3, and is conductively connected to the electrode assembly 2. In the positive electrode terminal 4A, the positive electrode flange portion 41A and the positive electrode shaft portion 42A are integrated. The positive electrode terminal 4A of the present embodiment is formed of, for example, aluminum or an aluminum-based metal such as an aluminum alloy The positive electrode flange portion 41A spreads along the lid plate 32 of the case 3. To be more specific, the positive electrode flange portion 41A has a rectangular plate shape elongated in the X axis direction. The positive electrode flange portion 41A includes a welding surface 411A on a side opposite to the case 3. The welding surface 411A faces outside in the Z axis direction (the side opposite to the case 3), and is a surface to which a member (conductive member such as a bus bar) for conductively connecting the positive electrode terminal 4A to an external terminal of another energy storage device, an external device, and the like is welded.

The positive electrode shaft portion 42A extends in the Z axis direction and penetrates the case 3. That is, the positive electrode shaft portion 42A penetrates the case 3 (lid plate 32) in the Z axis direction. Specifically, the positive electrode shaft portion 42A includes a positive electrode shaft portion body 420A extending in the Z axis direction, and a positive electrode enlarged diameter portion 421A spreading from the positive electrode shaft portion body 420A when viewed from the Z axis direction.

The positive electrode shaft portion body 420A is a columnar portion extending in the Z axis direction, and penetrates the case 3 (specifically, the lid plate 32). The positive electrode shaft portion body 420 of the present embodiment has a circular columnar shape, and penetrates the insulating member 7A, the lid plate 32, the insulating member 7B, and the current collector 5.

The case 3 and the current collector 5 are sandwiched between the positive electrode enlarged diameter portion 421A and the positive electrode flange portion 41A in the Z axis direction. The positive electrode enlarged diameter portion 421A of the present embodiment sandwiches the insulating member 7A, the lid plate 32, the insulating member 7B, and the current collector 5 with the positive electrode flange portion 41A. The positive electrode enlarged diameter portion 421A spreads (is enlarged in diameter) along the current collector 5 inside the case 3.

As shown in FIG. 1, FIG. 2, and FIG. 5 to FIG. 7, the negative electrode terminal 4B includes a negative electrode flange portion (flange portion) 41B that spreads along the case 3 outside the case 3, and a negative electrode shaft portion (shaft portion) 42B that extends from the negative electrode flange portion 41B, penetrates the case 3, and is conductively connected to the electrode assembly 2. In the negative electrode terminal 4B, the negative electrode flange portion 41B and the negative electrode shaft portion 42B are separate bodies (separate members).

The negative electrode flange portion 41B spreads along the lid plate 32 of the case 3. To be more specific, the negative electrode flange portion 41B has a rectangular plate shape elongated in the X axis direction. The negative electrode flange portion 41B includes a through hole 412B through which the negative electrode shaft portion 42B is inserted. The through hole 412B penetrates the negative electrode flange portion 41B in the Z axis direction (in other words, the thickness direction of the negative electrode flange portion 41B). The through hole 412B of the present embodiment has a circular shape and is disposed at a central portion of the negative electrode flange portion 41B.

The negative electrode flange portion 41B includes a welding surface 411B on a side opposite to the case 3. As with the welding surface 411A of the positive electrode terminal 4A, the welding surface 411B is directed outward in the Z axis direction, and is a surface to which a conductive member such as a bus bar is welded.

The negative electrode flange portion 41B is formed of a clad material including a plurality of (two in the example of the present embodiment) metal layers 411 stacked in the Z axis direction. The metal layers 411 adjacent to each other in the plurality of metal layers 411 are formed of different kinds of metals.

In the negative electrode flange portion 41B, a metal layer (second metal layer) 411*a* at one end (lower side in FIGS. 6 and 7) of the plurality of metal layers 411 in the Z axis direction is formed of the same type of metal as the negative electrode shaft portion 42B. In the negative electrode flange portion 41B, a metal layer (first metal layer) 411*b* at the other end (upper side in FIGS. 6 and 7) in the Z axis direction of the plurality of metal layers 411 in the Z axis direction is formed of a metal different from the negative electrode shaft portion 42B. In the negative electrode flange portion 41B, the second metal layer 411*a* or the first metal layer 411*b* covers a peripheral end surface 411*c* of the remaining metal layer of the plurality of metal layers 411.

The negative electrode flange portion 41B of the present embodiment includes two metal layers which are the second metal layer 411*a* and the first metal layer 411*b*. In the negative electrode flange portion 41B, the first metal layer 411*b* covers the peripheral end surface 411*c* of the remaining metal layer (second metal layer) 411*a*. The electrical resistance of the metal forming the first metal layer 411*b* is larger than the electrical resistance of the metal forming the second metal layer 411*a*. In the negative electrode flange portion 41B of the present embodiment, for example, the second metal layer 411*a* is formed of copper or a copper-based metal such as a copper alloy, and the first metal layer 411*b* is formed of aluminum or an aluminum-based metal such as an aluminum alloy The second metal layer 411*a* is located on the case 3 side with respect to the first metal layer 411*b* in the negative electrode flange portion 41B. The second metal layer 411*a* spreads along an X-Y plane (plane including the X axis direction and the Y axis direction) direction, and the dimension (thickness) in the Z axis direction at each position in an X-Y plane direction excluding the through hole 412B is constant. The second metal layer 411*a* of the present embodiment has a rectangular shape having a dimension in the X axis direction of 20 mm and a dimension in the Y axis direction of 8.3 mm, and has a thickness of 0.5 mm.

The first metal layer 411*b* is located on the side opposite to the case 3 with respect to the second metal layer 411*a* in the negative electrode flange portion 41B. The first metal layer 411*b* spreads along the X-Y plane (plane including the X axis direction and the Y axis direction) direction and includes a thin-walled portion (concave part) 4111 recessed in the Z axis direction or a through hole penetrating in the Z axis direction. The first metal layer 411*b* of the present embodiment includes a concave part. The first metal layer 411*b* of the present embodiment includes the thin-walled portion 4111 surrounding the through hole 412B and a portion (thick-walled portion) 4112 of the first metal layer 411*b* excluding the thin-walled portion 4111.

The thin-walled portion 4111 is thinner than the thick-walled portion 4112 in the first metal layer 411*b*. The width of the thin-walled portion 4111 at each position in the circumferential direction (the radial dimension of the through hole 412B) is constant. That is, when viewed from the Z axis direction, a peripheral edge (boundary position with the thick-walled portion 4112) 4111*a* (see FIG. 7) of the thin-walled portion 4111 and an inner peripheral edge (boundary position with the through hole 412B) 4111*b* (see FIG. 7) are concentric circles. For example, the peripheral edge 4111*a* of the present embodiment has a diameter of 7.3 mm, and the inner peripheral edge 4111*b* has a diameter of 4 mm.

The thick-walled portion 4112 is a portion surrounding the thin-walled portion 4111 in the first metal layer 411*b*. The thick-walled portion 4112 includes a cover portion 4112*c* extending toward the second metal layer 411*a* and covering the peripheral end surface 411*c* of the second metal layer 411*a* at the peripheral edge portion. In the thick-walled portion 4112, the dimension (thickness) in the Z axis direction at each position in the X-Y plane direction is constant except for the cover portion 4112*c*. The thickness of the thick-walled portion (excluding the peripheral edge portion) 4112 of the present embodiment is the same as the thickness of the second metal layer 411*a*. Thus, the thin-walled portion 4111 is thinner than the second metal layer 411*a*. In the thick-walled portion 4112 of the present embodiment, the cover portion 4112*c* is provided in the entire circumferential region of the thick-walled portion 4112.

In the first metal layer 411*b*, the thin-walled portion 4111 is a portion having substantially the same dimension in the Z axis direction at each position in the radial direction of the through hole 412B, and a portion having a larger dimension in the Z axis direction than the thin-walled portion 4111 is the thick-walled portion 4112. In the first metal layer 411*b* of the present embodiment, a step 4111*d* is formed at the boundary between the thin-walled portion 4111 and the thick-walled portion 4112 (see FIG. 7). The welding surface 411B of the negative electrode flange portion 41B is formed by an outer surface (surface facing the side opposite to the case 3) of the thick-walled portion 4112 of the first metal layer 411*b*.

The negative electrode shaft portion 42B extends in the Z axis direction and penetrates the case 3. That is, the negative electrode shaft portion 42B penetrates the case 3 (lid plate 32) in the Z axis direction. Specifically, the negative electrode shaft portion 42B includes a negative electrode shaft portion body 420B extending in the Z axis direction, and a plurality of enlarged diameter portions (first enlarged diameter portion (swaged portion) 421B, second enlarged diameter portion (enlarged diameter portion) 422B, third enlarged diameter portion 423B) spreading from a negative electrode shaft portion body 420B when viewed from the Z axis direction. The negative electrode shaft portion body 420B and the plurality of enlarged diameter portions 421B, 422B, and 423B are integrated. The negative electrode shaft portion 42B is formed of, for example, copper or a copper-based metal such as a copper alloy.

The negative electrode shaft portion body 420B is a columnar portion extending in the Z axis direction, and penetrates the case 3 (specifically, the lid plate 32). The negative electrode shaft portion body 420B of the present embodiment has a circular columnar shape, and penetrates the insulating member 7A, the lid plate 32, the insulating member 7B, and the current collector 5.

The first enlarged diameter portion (swaged portion) 421B spreads (is enlarged in diameter) along the first metal layer 411*b* of the negative electrode flange portion 41B on the outer side (the side opposite to the case 3) of the negative electrode flange portion 41B in the Z axis direction. Specifically, the first enlarged diameter portion 421B spreads along the thin-walled portion 4111 of the first metal layer 411*b*. The first enlarged diameter portion 421B is smaller than the thin-walled portion 4111 and is formed at a position included in a region where the thin-walled portion 4111 is formed when viewed from the Z axis direction. That is, the first metal layer 411*b* includes the thin-walled portion 4111 in a region larger than the first enlarged diameter portion 421B and including the first enlarged diameter portion 421B as viewed in the Z axis direction. The first enlarged diameter portion 421B includes, in its surface, a first conductive surface (conductive surface) 4210B facing the case 3 side and in contact with (conductively connected to) the thin-walled portion 4111 (see FIG. 6). The first enlarged diameter portion 421B of the present embodiment spreads within a range of the thin-walled portion 4111 from an end portion on the other side (upper side in FIG. 6) in the Z axis direction of the negative electrode shaft portion body 420B, and the contour viewed from the Z axis direction is a circular shape concentric with the negative electrode shaft portion body 420B. As described above, the first enlarged diameter portion 421B is smaller than the thin-walled portion 4111 when viewed from the Z axis direction. That is, when viewed from the Z axis direction, there is a gap (a portion recessed in a groove shape) between the contour of the first enlarged diameter portion 421B and the boundary position 4111*a* between the thin-walled portion 4111 and the thick-walled portion 4112 in the first metal layer 411*b*.

The second enlarged diameter portion (enlarged diameter portion) 422B sandwiches a peripheral edge portion (through-hole peripheral edge portion 413B: see FIG. 7) of the through hole 412B in the negative electrode flange portion 41B with the first enlarged diameter portion 421B in the Z axis direction. The second enlarged diameter portion 422B spreads (is enlarged in diameter) along the second metal layer 411*a* of the negative electrode flange portion 41B on the inner side (the case 3 side) of the negative electrode flange portion 41B in the Z axis direction. To be more specific, the second enlarged diameter portion 422B spreads along a peripheral edge portion (a portion overlapping the thin-walled portion 4111) of the through hole 412B in the second metal layer 411*a*. The second enlarged diameter portion 422B includes, in its surface, a second conductive surface 4220B facing the opposite side to the case 3 side and in contact with (conductively connected to) the second metal layer 411*a* (see FIG. 6). The second enlarged diameter portion 422B of the present embodiment spreads from an intermediate position in the Z axis direction of the negative electrode shaft portion body 420B, and the contour viewed from the Z axis direction is a circular shape concentric with the negative electrode shaft portion body 420B.

In the negative electrode flange portion 41B of the present embodiment, the through-hole peripheral edge portion 413B is formed from the thin-walled portion 4111 of the first metal layer 411*b* and a portion corresponding to the thin-walled portion 4111 in the second metal layer 411*a* (a portion where the thin-walled portion 4111 overlaps).

The case 3 and the current collector 5 are sandwiched between the third enlarged diameter portion 423B and the second enlarged diameter portion 422B in the Z axis direction. The third enlarged diameter portion 423B of the present embodiment sandwiches the insulating member 7A, the lid plate 32, the insulating member 7B, and the current collector 5 with the second enlarged diameter portion 422B. Specifically, the third enlarged diameter portion 423B spreads (is enlarged in diameter) along the current collector 5 inside the case 3. The third enlarged diameter portion 423B includes, in its surface, a third conductive surface 4230B facing the case 3 in the Z axis direction and in contact with (conductively connected to) the current collector 5 (see FIG. 6). The third enlarged diameter portion 423B of the present embodiment spreads from an end portion on one side (lower side in FIG. 6) in the Z axis direction of the negative electrode shaft portion body 420B, and the contour viewed from the Z axis direction is a circular shape concentric with the negative electrode shaft portion body 420B.

The first enlarged diameter portion 421B and the third enlarged diameter portion 423B described above are formed when the negative electrode flange portion 41B is attached to the negative electrode shaft portion 42B or when the negative electrode shaft portion 42B (or the negative electrode terminal 4B) is attached to the case 3. The details are as follows.

Figure 8:
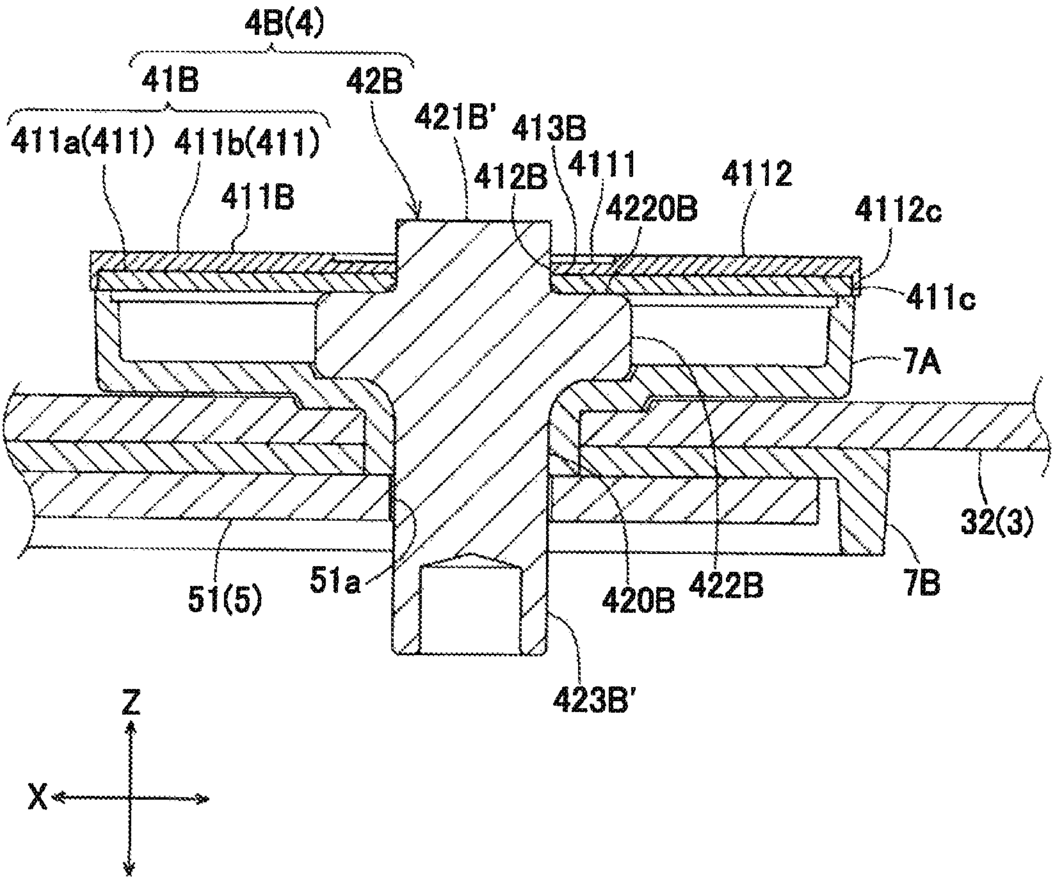
FIG. 8 is a cross-sectional view showing a configuration of a negative electrode shaft portion and its periphery in a state where the negative electrode shaft portion is not swaged.
Figure 9:
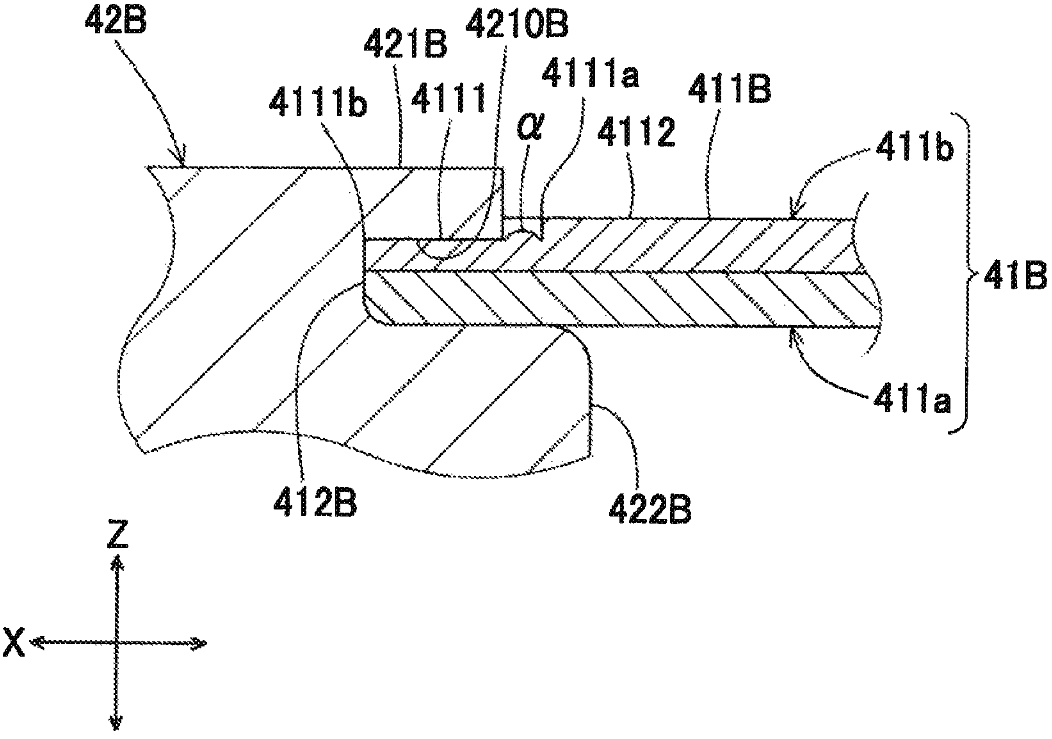
FIG. 9 is a view for explaining swelling of a thin-walled portion caused by swaging.

In the negative electrode shaft portion 42B, a portion corresponding to the first enlarged diameter portion 421B before the negative electrode flange portion 41B is attached (fixed) is a columnar portion (first enlarged diameter portion equivalent portion) 421B' that can be inserted through the through hole 412B of the negative electrode flange portion 41B as shown in FIGS. 2 and 8. Swaging is performed in a state where the first enlarged diameter portion equivalent portion 421B' is inserted through the through hole 412B of the negative electrode flange portion 41B, and the through-hole peripheral edge portion 413B of the negative electrode flange portion 41B is abutted against the second enlarged diameter portion (portion having a larger diameter than the through hole 412B) 422B (see FIG. 8). As a result, the first enlarged diameter portion equivalent portion 421B' spreads along the through-hole peripheral edge portion 413B (thin-walled portion 4111), so that the first enlarged diameter portion 421B is formed, and the negative electrode flange portion 41B is connected (fixed) to the negative electrode shaft portion 42B.

At this time, since the first metal layer 411*b* is formed of an aluminum-based metal, the first metal layer 411*b* is soft, and when the first enlarged diameter portion equivalent portion 421B' is swaged, the peripheral edge portion of the through hole 412B in the first metal layer 411*b* is compressed, so that a part thereof tends to extend in a direction away from the through hole 412B. However, since the negative electrode flange portion 41B is formed of the clad material, the first metal layer 411*b* and the second metal layer (second metal layer formed of hard copper-based metal) 411*a* are secured to each other, and therefore, the compressed portion (the peripheral edge portion of the through hole 412B in the first metal layer 411*b*) cannot extend, so that when the first enlarged diameter portion 421B is formed, the periphery thereof (the first metal layer 411*b* around the first enlarged diameter portion 421B) swells (see reference sign a in FIG. 9). Even if the swelling (convex part) $\alpha$ is formed around the first enlarged diameter portion 421B as described above, the first enlarged diameter portion 421B is smaller than the thin-walled portion 4111 in the X-Y plane direction. That is, a gap is formed between the peripheral edge of the first enlarged diameter portion 421B and the boundary position 4111*a* in the thin-walled portion 4111 between the thick-walled portion 4112 and the thin-walled portion 4111, and therefore, the formed swelling $\alpha$ is located in the gap (that is, the inside of the thin-walled portion 4111). This prevents formation of the swelling $\alpha$ on the outer surface of the thick-walled portion 4112 (the welding surface 411B of the negative electrode flange portion 41B) due to swaging when the first enlarged diameter portion 421B is formed.

As shown in FIGS. 2 and 8, in the negative electrode shaft portion 42B, a portion corresponding to the third enlarged diameter portion 423B before being attached (fixed) to the case 3 is a cylindrical portion (third enlarged diameter portion equivalent portion) 423B' that can be inserted through each through hole provided in the insulating member 7A, the case 3 (the lid plate 32 in the example of the present embodiment), the insulating member 7B, and the current collector 5. The third enlarged diameter portion equivalent portion 423B' is swaged and enlarged in diameter in a state of being inserted through each through-hole of the insulating member 7A, the case 3, the insulating member 7B, and the current collector 5 (in other words, a state of penetrating each of the members 7A, 3, 7B, and 5: see FIG. 8), so that the third enlarged diameter portion 423B is formed.

The order in which the first enlarged diameter portion 421B and the third enlarged diameter portion 423B are formed is not limited. The first enlarged diameter portion 421B and the third enlarged diameter portion 423B may be formed in this order, or the third enlarged diameter portion 423B and the first enlarged diameter portion 421B may be formed in this order. The first enlarged diameter portion 421B and the third enlarged diameter portion 423B may be formed at the same timing.

Returning to FIG. 2, the current collector 5 is disposed in the case 3 and is directly or indirectly connected to the electrode assembly 2 in a conductive manner. The current collector 5 of the present embodiment is connected to the electrode assembly 2 via a clip member 50 in a conductive manner. That is, the energy storage device 1 includes the clip member 50 which connects the electrode assembly 2 and the current collector 5 to each other in a conductive manner.

The current collector 5 is formed of a conductive member. The current collector 5 is disposed along an inner surface of the case 3. The current collector 5 of the present embodiment connects the external terminal 4 and the clip member 50 in a conductive manner. To be more specific, the current collector 5 includes a first connecting portion 51 connected to the external terminal 4 in a conductive manner, a second connecting portion 52 connected to the electrode assembly 2 in a conductive manner, and a bent portion 53 which connects the first connecting portion 51 and the second connecting portion 52 to each other. In the current collector 5, the bent portion 53 is disposed near a boundary between the lid plate 32 and the short wall portion 314 in the case 3, the first connecting portion 51 extends from the bent portion 53 along the lid plate 32, and the second connecting portion 52 extends from the bent portion 53 along the short wall portion 314. The first connecting portion 51 includes a through hole 51*a*, and is conductively connected to the enlarged diameter portion (the positive electrode enlarged diameter portion 421A or the third enlarged diameter portion 423B) in a state where the shaft portion (the positive electrode shaft portion 42A or the negative electrode shaft portion 42B) of the external terminal 4 is inserted through the through hole 51*a*. The second connecting portion 52 of the present embodiment is joined to the clip member 50 by ultrasonic welding, for example.

The current collector 5 configured as described above is disposed on each of the positive electrode and the negative electrode of the energy storage device 1. In the energy storage device 1 of the present embodiment, the current collector 5 is disposed along the uncovered stacked portion 26 of the positive electrode and the uncovered stacked portion 26 of the negative electrode of the electrode assembly 2 in the case 3. The current collector 5 of the positive electrode and the current collector 5 of the negative electrode are formed of different materials. Specifically, the current collector 5 of the positive electrode is formed of, for example, aluminum or an aluminum-based metal such as an aluminum alloy, and the current collector 5 of the negative electrode is formed of, for example, copper or a copper-based metal such as a copper alloy.

The clip member 50 sandwiches the positive electrode 23 or the negative electrode 24 stacked in the uncovered stacked portion 26 of the electrode assembly 2 in a bundled manner. As a result, the clip member 50 reliably conductively connects the positive electrodes 23 or the negative electrodes 24 stacked in the uncovered stacked portion 26. The clip member 50 of the present embodiment is formed by bending a plate-shaped metal material so as to have a U-shaped cross section.

The insulating member 6 is disposed between the case 3 (to be more specific, the case body 31) and the electrode assembly 2. The insulating member 6 is formed in a bag shape by bending an insulating sheet-like member cut into a predetermined shape.

In the energy storage device 1 described above, even when the convex part α caused by swaging is formed around the first enlarged diameter portion 421B on the surface 411B of the negative electrode flange portion 41B on the side opposite to the case 3, the position of the first enlarged diameter portion 421B on the surface 411B of the negative electrode flange portion 41B and the periphery thereof are recessed, that is, the thin-walled portion 4111 is formed; therefore, when another member is connected to the negative electrode flange portion 41B, the convex part α does not interfere, and the connection is easy.

Figure 6:
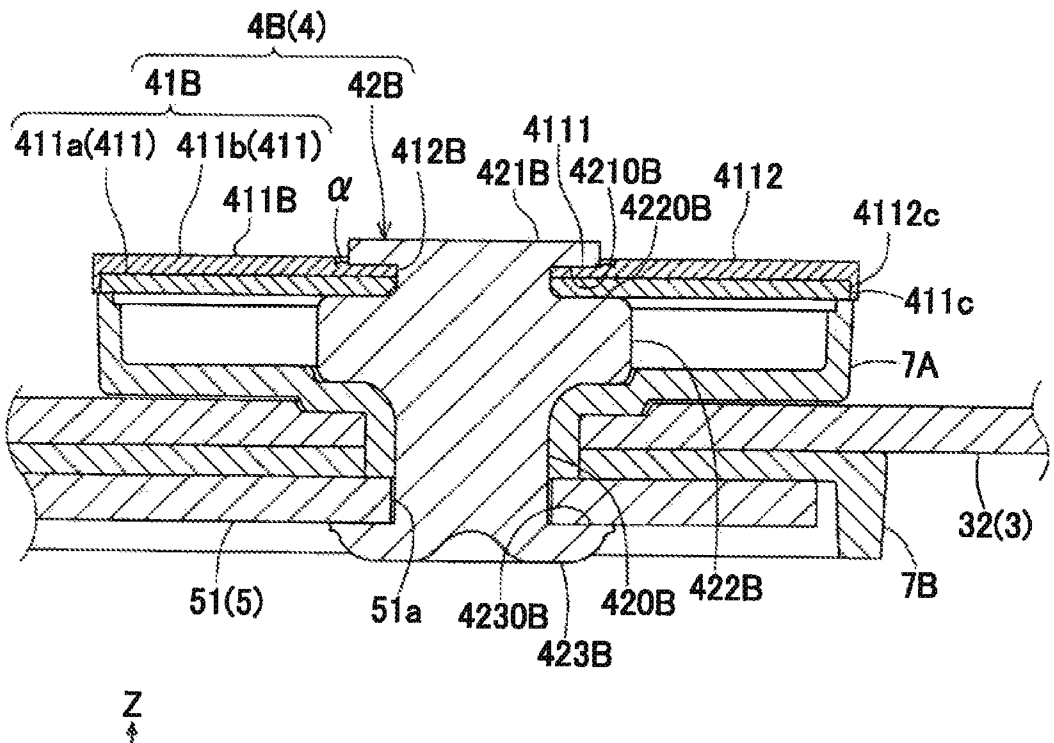
FIG. 6 is a cross-sectional view taken along line VI-VI in FIG. 5.

In the energy storage device 1 of the present embodiment, in the negative electrode flange portion 41B, the first metal layer 411*b* covers the peripheral end surface 411*c* of the remaining metal layer (second metal layer) 411*a* (see FIG. 6). As described above, in the negative electrode flange portion (clad material) 41B, each of the peripheral end surfaces 411*c* of the remaining metal layer (second metal layer) 411*a* is covered with the outermost metal layer (first metal layer 411*b*) among the plurality of metal layers 411, so that the entry of moisture from a peripheral end of the negative electrode flange portion 41B into between the metal layers 411*a* and 411*b* is effectively suppressed.

In the energy storage device 1, since the side opposite to the case 3 (upper side in FIG. 6) without the arrangement of other members is more open than the case 3 side of the negative electrode flange portion 41B, moisture easily approaches the negative electrode flange portion 41B from the opposite side. Thus, as in the energy storage device 1 of the present embodiment, the first metal layer 411*b* at an end opposite to the case 3 in the negative electrode flange portion 41B covers the peripheral end surface 411*c* of the remaining metal layer (second metal layer) 411*a* from the side opposite to the case 3 toward the case 3, so that the entry of moisture from the released side (side opposite to the case 3) into between the metal layers 411*a* and 411*b* can be suppressed more effectively.

In the negative electrode flange portion 41B of the negative electrode terminal 4B of the present embodiment, the electrical resistance of the metal (in the example of the present embodiment, an aluminum-based metal) forming the first metal layer 411*b* is larger than the electrical resistance of the metal (in the example of the present embodiment, a copper-based metal) forming the second metal layer 411*a*. In a portion of the negative electrode flange portion 41B which is conductively connected to the negative electrode shaft portion 42B, specifically, a portion (through-hole peripheral edge portion 413B) sandwiched between the first enlarged diameter portion 421B (first conductive surface 4210B) and the second enlarged diameter portion 422B, the first metal layer 411*b* (thin-walled portion 4111) is thinner than the second metal layer 411*a* (see FIG. 7). According to such a configuration, as compared with a case where the two metal layers 411*a* and 411*b* have the same thickness in the through-hole peripheral edge portion 413B, the electrical resistance (electrical resistance value) between the first metal layer 411*b* and the first enlarged diameter portion 421B (first conductive surface 4210B) is suppressed, whereby the conduction between the negative electrode shaft portion 42B and the negative electrode flange portion 41B is improved.

In the energy storage device 1 of the present embodiment, in the first metal layer 411*b*, the portion (thin-walled portion) 4111 conductively connected to the negative electrode shaft portion 42B (first conductive surface 4210B) is thinner than the thick-walled portion 4112. The surface of the thick-walled portion 4112 forms the welding surface 411B. That is, the thick-walled portion 4112 includes the welding surface 411B. As described above, in the first metal layer 411*b*, the portion (thin-walled portion) 4111 conductively connected to the negative electrode shaft portion 42B (first conductive surface 4210B) is thinned, and the thick-walled portion 4112 is thickened, whereby favorable conduction between the negative electrode shaft portion 42B and the negative electrode flange portion 41B is achieved, and the influence of heat due to the welding to the second metal layer 411*a* is suppressed when another member is welded to the welding surface 411B of the first metal layer 411*b*.

The energy storage device of the present invention is not limited to the above-mentioned embodiment, but can of course be subjected to various changes and modifications within the scope not departing from the gist of the present invention. For example, a configuration according to an embodiment can additionally be provided with a configuration according to another embodiment, or a configuration according to an embodiment can partially be replaced with a configuration according to another embodiment. Furthermore, a configuration according to an embodiment can be removed partially.

In the energy storage device 1 of the above embodiment, only in the negative electrode terminal 4B, the flange portion (negative electrode flange portion 41B) and the shaft portion (negative electrode shaft portion 42B) are formed of different members, but the present invention is not limited to this configuration. Also in the positive electrode terminal 4A, the flange portion (positive electrode flange portion 41A) and the shaft portion (positive electrode shaft portion 42A) may be formed of different members.

Figure 10:
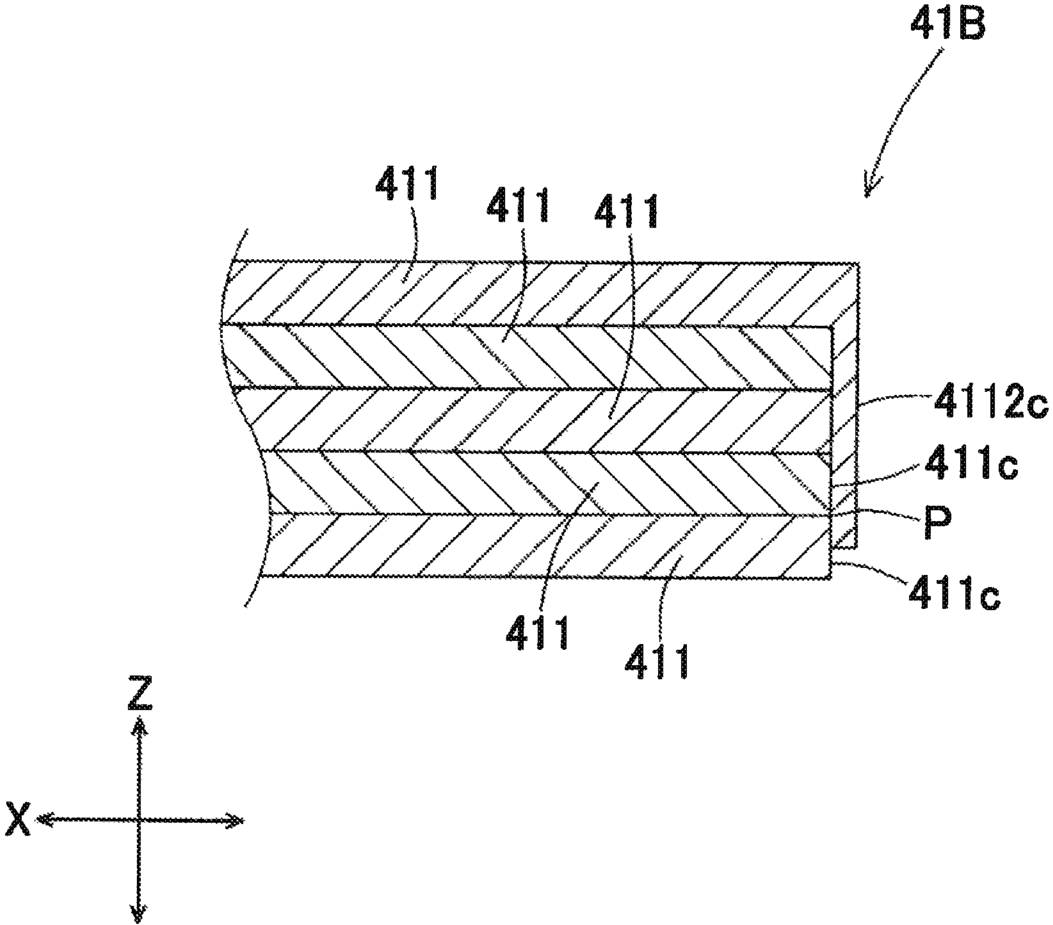
FIG. 10 is an enlarged cross-sectional view for explaining a configuration of a negative electrode flange portion according to another embodiment.

The negative electrode flange portion 41B is formed of the clad material having the two metal layers 411 (specifically, the first metal layer 411*b* and the second metal layer 411*a*), but is not limited to this configuration. As shown in FIG. 10, the negative electrode flange portion 41B may be formed of a clad material having three or more metal layers 411. In this case, if the metal layers 411 adjacent to each other are different types of metals, the clad material may include the plurality of metal layers 411 formed of the same type of metal.

When the negative electrode flange portion 41B includes the three or more metal layers 411 as described above, the first metal layer (metal layer at an end opposite to the case 3 in the Z axis direction of the plurality of metal layers 411) 411*b* may include a through hole penetrating in the Z axis direction at a portion corresponding to the thin-walled portion 4111. Even in this case, when the first enlarged diameter portion 421B is formed, the convex part α is formed around the first enlarged diameter portion 421B; however, since the first metal layer 411*b* includes the through hole, the convex part α does not interfere when another member is connected to the negative electrode flange portion 41B, and the connection is easy.

Figure 7:
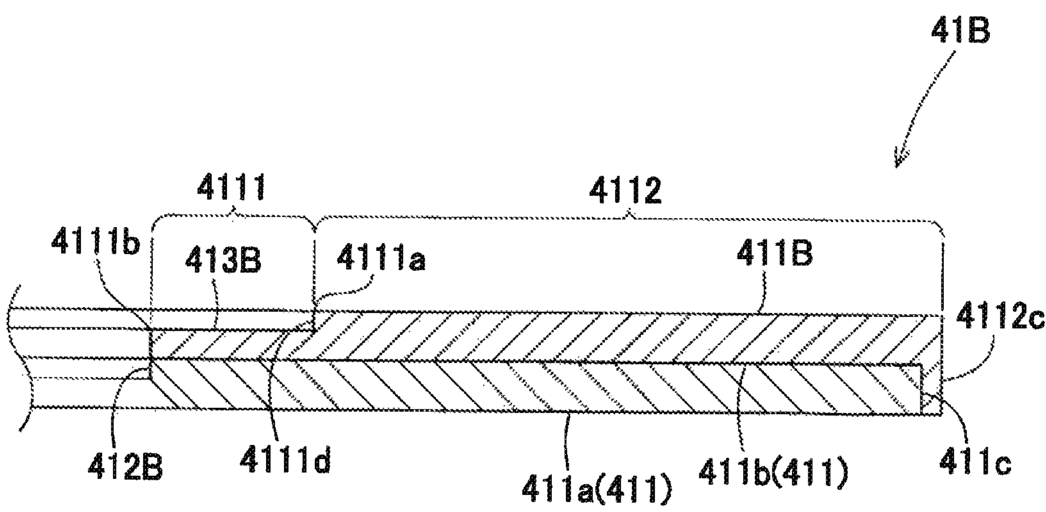
FIG. 7 is a cross-sectional view for explaining a configuration of a negative electrode flange portion.
Figure 7:
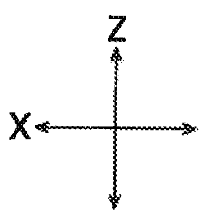

In the negative electrode flange portion 41B of the above embodiment, the metal layer (the cover portion 4112*c* of the first metal layer 411*b*) at the other end in the Z axis direction covers the entire peripheral end surface 411*c* (up to the lower end (one end in the Z axis direction) in FIG. 7) of the remaining metal layer (the second metal layer 411*a*), but the present invention is not limited to this configuration. As shown in FIG. 10, the cover portion 4112*c* may cover up to one side in the Z axis direction from a boundary position P between the adjacent metal layers 411. For example, in the example shown in FIG. 10, the cover portion 4112*c* covers up to a position below the boundary position P between the peripheral end surface 411*c* of the lowermost metal layer 411 and the peripheral end surface 411*c* of the second metal layer 411 from the bottom and above the lower end of the peripheral end surface 411*c* of the lowermost metal layer 411.

In the negative electrode flange portion 41B of the above embodiment, the peripheral edge portion (cover portion 4112*c*) of the first metal layer 411*b* covers the peripheral end surface 411*c* (boundary position P between the adjacent metal layers 411) of the second metal layer 411*a* over the entire region in the circumferential direction (see FIGS. 5 and 7), but the present invention is not limited to this configuration. The cover portion 4112*c* may be configured to cover the boundary position P between the adjacent metal layers 411 in a part of the circumferential direction (the circumferential direction of the negative electrode flange portion 41B).

Figure 11:
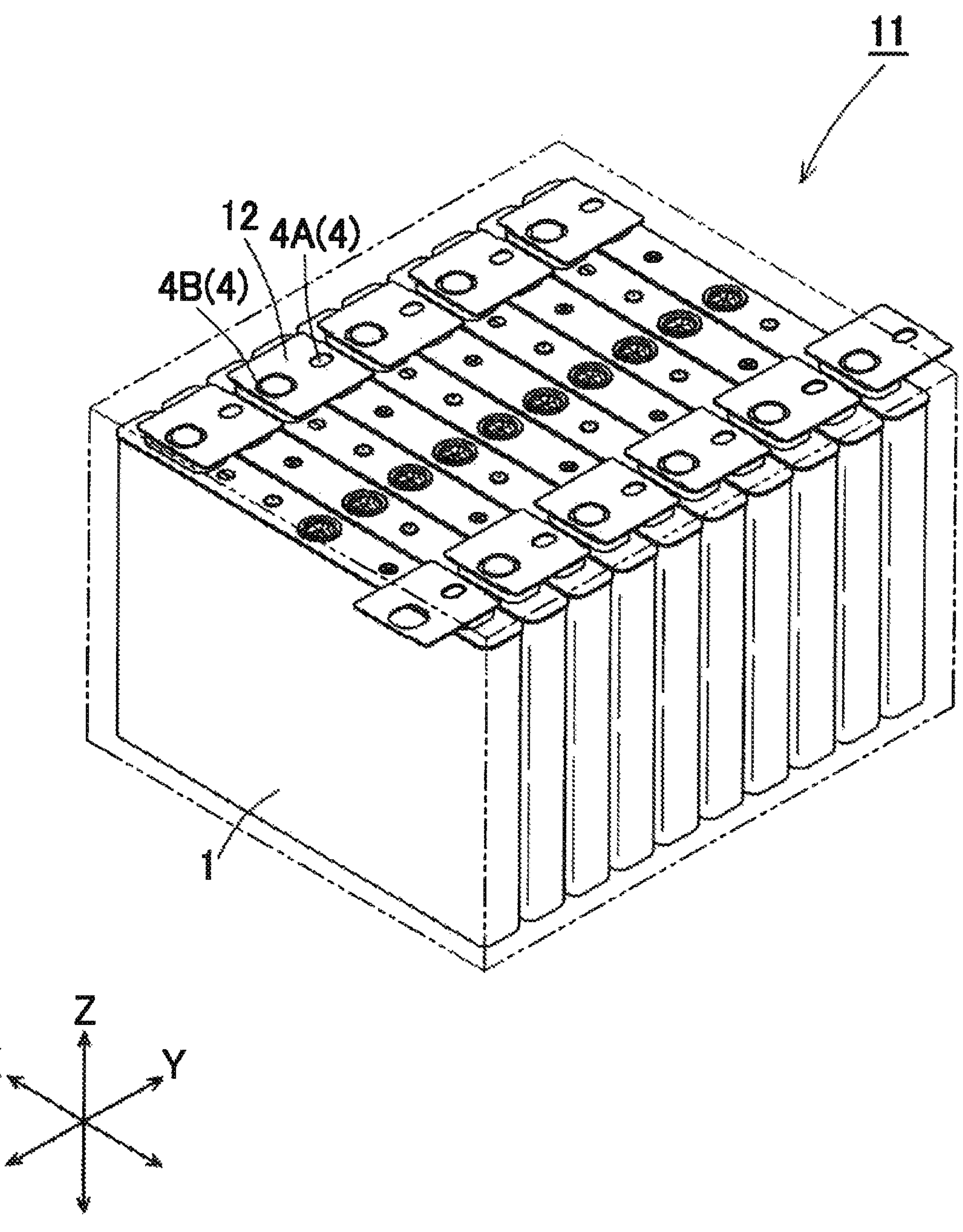
FIG. 11 is a schematic view of an energy storage apparatus including the energy storage device.
Figure 12:
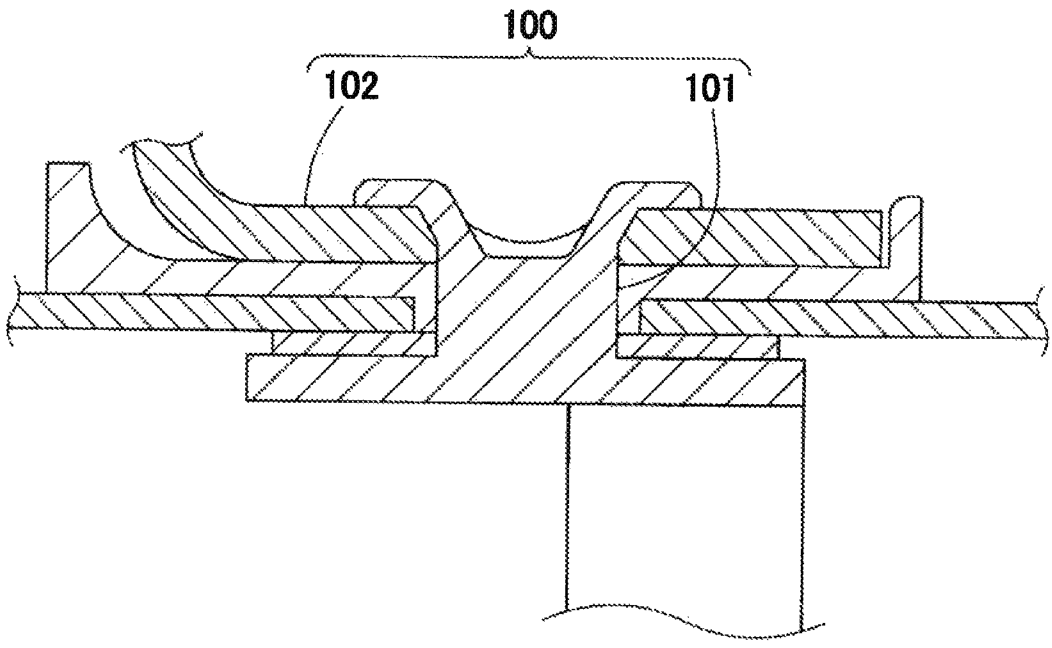
FIG. 12 is an enlarged cross-sectional view for explaining a configuration of a conventional external terminal.

In a peripheral end portion of the negative electrode flange portion 41B, the metal layer 411*b* at the other end (the side opposite to the case 3: the upper side in FIG. 6) of the plurality of metal layers 411 in the Z axis direction covers the peripheral end surface 411*c* of the metal layer 411*a* at one end (the case 3 side: the lower side in FIG. 6) of the plurality of metal layers 411 in the Z axis direction, but the present invention is not limited to this configuration. As shown in FIG. 11, the metal layer 411 at one end (case 3 side) of the plurality of metal layers in the Z axis direction may cover the peripheral end surface 411*c* of the metal layer 411 at the other end (side opposite to the case 3) of the plurality of metal layers in the Z axis direction. That is, the cover portion 4112*c* may be configured to extend in a direction away from the case 3 from the metal layer 411*a* at the end on the case 3 (lid plate 32) side in the Z axis direction.

In the above embodiment, the case where the energy storage device is used as a chargeable and dischargeable nonaqueous electrolyte secondary battery (for example, a lithium ion secondary battery) has been described; however, the type and size (capacity) of the energy storage device are arbitrary. In the above embodiment, the lithium ion secondary battery has been described as an example of the energy storage device, but the present invention is not limited thereto. For example, the present invention is also applicable to various secondary batteries, primary batteries, and energy storage devices of capacitors such as electric double layer capacitors.

The energy storage device (for example, battery) 1 may be used in an energy storage apparatus (a battery module when the energy storage device is a battery) 11 as shown in FIG. 11. The energy storage apparatus 11 includes at least two energy storage devices 1 and a bus bar member 12 which electrically connects two (different) energy storage devices 1 to each other. In this case, the technique of the present invention may be applied to at least one energy storage device 1.

DESCRIPTION OF REFERENCE SIGNS

1: energy storage device
2: electrode assembly
21: winding core
22: layered product
23: positive electrode
231: metal foil
232: positive active material layer
24: negative electrode
241: metal foil
242: negative active material layer
25: separator
26: uncovered stacked portion
3: case
31: case body
311: blocking portion
312: body portion
313: long wall portion
314: short wall portion
32: lid plate
34: opening peripheral edge portion
4: external terminal
4A: positive electrode terminal (external terminal)
41A: positive electrode flange portion
411A: welding surface
42A: positive electrode shaft portion
420A: positive electrode shaft portion body
421A: positive electrode enlarged diameter portion
4B: negative electrode terminal (external terminal)
41B: negative electrode flange portion (flange portion)
411B: welding surface
412B: through hole
413B: through-hole peripheral edge portion
411: metal layer
411*a*: second metal layer
411*b*: first metal layer
411*c*: peripheral end surface
4111: thin-walled portion
4111*a*: peripheral edge of thin-walled portion (boundary position between thin-walled portion and thick-walled portion)
4111*b*: inner peripheral edge of thin-walled portion
4111*d*: step
4112: thick-walled portion
4112*c*: cover portion
42B: negative electrode shaft portion (shaft portion)
420B: negative electrode shaft portion body
421B: first enlarged diameter portion (swaged portion)
421B': first enlarged diameter portion equivalent portion
4210B: first conductive surface
422B: second enlarged diameter portion (enlarged diameter portion)
4220B: second conductive surface
423B: third enlarged diameter portion
423B': third enlarged diameter portion equivalent portion
4230B: third conductive surface
4250B: conductive surface
5: current collector
50: clip member
51: first connecting portion
51*a*: through hole
52: second connecting portion
53: bent portion
6: insulating member
7A, 7B: insulating member
11: energy storage apparatus
12: bus bar member
100: external terminal
101: shaft portion
102: flange portion
C: winding center axis
P: boundary position
α: swelling (convex part)

The invention claimed is:

1. An energy storage device comprising:

an electrode assembly;

a case that houses the electrode assembly; and a metal external terminal disposed in the case and welded to a busbar member, wherein the external terminal includes:

a flange portion spreading along the case outside the case; and a shaft portion extending from the flange portion, penetrating the case, and conductively connected to the electrode assembly, wherein the flange portion is formed of a clad material including a plurality of metal layers stacked in a penetrating direction of the shaft portion, and includes a through hole through which the shaft portion is inserted, wherein the shaft portion includes:

an enlarged diameter portion spreading along a surface of the flange portion on a case side; and a swaged portion spreading along a surface of the flange portion on a side opposite to the case and sandwiching a peripheral edge portion of the through hole in the flange portion between the swaged portion and the enlarged diameter portion, wherein a first metal layer that is a metal layer at an end opposite to the case in the penetrating direction among the plurality of metal layers includes:

a concave part recessed in the penetrating direction or a through hole penetrating in the penetrating direction in a region that is larger than the swaged portion when viewed from the penetrating direction and includes the swaged portion when viewed from the penetrating direction; and a welding surface welded to the busbar member, which is a surface opposite to the case in the penetrating direction, wherein a second metal layer that is a metal layer facing the case in the penetrating direction among the plurality of metal layers includes a through hole through which the shaft portion is inserted, wherein the first metal layer contains aluminum or an aluminum-based metal, wherein the second metal layer contains copper or a copper-based metal, wherein the flange portion includes a convex part protruding in the penetrating direction in the concave part of the first metal layer, wherein the convex part is a swelling spontaneously formed by compression of the first metal layer during formation of the swaged portion, wherein the convex part is disposed between a peripheral edge of the concave part and a peripheral edge of the swaged portion facing the peripheral edge of the concave part in a direction orthogonal to the penetrating direction, and wherein the convex part is disposed entirely within the concave part such that the convex part does not extend onto the welding surface.

2. The energy storage device according to claim 1, wherein the flange portion includes two metal layers that are the first metal layer and a second metal layer that is a metal layer at an end on the case side in the penetrating direction among the plurality of metal layers, and wherein electrical resistance of a metal forming the second metal layer is smaller than electrical resistance of a metal forming the first metal layer.

3. The energy storage device according to claim 1, wherein a thickness of the first metal layer disposed between the enlarged diameter portion and the swaged portion is smaller than a thickness of the second metal layer disposed between the enlarged diameter portion and the swaged portion in the penetrating direction.

4. The energy storage device according to claim 1, wherein the convex part is a deformed portion of the first metal layer protruding into the concave part of the first metal layer due to compression during formation of the swaged portion.

5. The energy storage device according to claim 1, wherein the first metal layer includes:

a thin-walled portion defining the concave part and surrounding the through hole of the first metal layer; and a thick-walled portion outside the thin-walled portion, wherein a thickness of the thin-walled portion is smaller than a thickness of the thick-walled portion in the penetrating direction.

6. The energy storage device according to claim 5, wherein the thin-walled portion includes a step at a boundary with the thick-walled portion, the step forming a peripheral edge of the concave part.

7. The energy storage device according to claim 1, wherein the convex part is spaced apart from the peripheral edge of the concave part in the direction orthogonal to the penetrating direction, such that the convex part does not contact the peripheral edge of the concave part.

8. The energy storage device according to claim 1, wherein the second metal layer includes a peripheral end surface that is an end surface in the direction orthogonal to the penetrating direction, and wherein the first metal layer includes a cover portion extending in the penetrating direction and covering at least a portion of the peripheral end surface of the second metal layer over an entire circumferential direction of the flange portion.

9. The energy storage device according to claim 1, wherein the flange portion includes exactly two metal layers consisting of the first metal layer and the second metal layer, and wherein the convex part is formed by deformation of the first metal layer into the concave part without penetrating through the second metal layer.

10. The energy storage device according to claim 1, wherein the external terminal is a negative electrode terminal, and wherein the swaged portion is formed by deforming an end of the shaft portion after insertion through the through hole, causing the convex part to protrude into the concave part while maintaining a space between the convex part and the peripheral edge of the swaged portion.

11. The energy storage device according to claim 1, wherein a thickness of the first metal layer in the concave part is reduced relative to a thickness of the first metal layer outside the concave part to accommodate deformation during swaging, and wherein the welding surface is formed on a thick-walled portion of the first metal layer outside the concave part.

12. An energy storage device comprising:

an electrode assembly;

a case that houses the electrode assembly; and a metal external terminal disposed in the case and welded to a busbar member, wherein the external terminal includes:

a flange portion spreading along an outer surface of the case outside the case; and a shaft portion extending from the flange portion, penetrating the case, and conductively connected to the electrode assembly, wherein the flange portion is formed of a clad material including a plurality of metal layers stacked in a penetrating direction of the shaft portion, and includes a through hole through which the shaft portion is inserted, wherein the shaft portion includes:

an enlarged diameter portion that is formed between the flange portion and the outer surface of the case and spreads along the outer surface of the case, and a swaged portion that spreads along a surface of the flange portion on a side opposite to the case and sandwiches a peripheral edge portion of the through hole in the flange portion between the swaged portion and the enlarged diameter portion, wherein a first metal layer that is a metal layer opposite to the case in the penetrating direction among the plurality of metal layers includes:

a concave part recessed in the penetrating direction or a through hole penetrating in the penetrating direction in a region that is larger than the swaged portion when viewed from the penetrating direction and includes the swaged portion when viewed from the penetrating direction; and a welding surface welded to the busbar member, which is a surface opposite to the case in the penetrating direction, wherein a second metal layer that is a metal layer facing the case in the penetrating direction among the plurality of metal layers includes a through hole through which the shaft portion is inserted, wherein the first metal layer contains aluminum or an aluminum-based metal, wherein the second metal layer contains copper or a copper-based metal, wherein the flange portion includes a convex part protruding in the penetrating direction in the concave part of the first metal layer, wherein the convex part is a swelling spontaneously formed by compression of the first metal layer during formation of the swaged portion, wherein the convex part is disposed between a peripheral edge of the concave part and a peripheral edge of the swaged portion facing the peripheral edge of the concave part in a direction orthogonal to the penetrating direction, and wherein the convex part is disposed entirely within the concave part such that the convex part does not extend onto the welding surface.

13. The energy storage device according to claim 12, wherein the flange portion includes two metal layers that are the first metal layer and a second metal layer that is a metal layer facing the case in the penetrating direction among the plurality of metal layers, and wherein electrical resistance of a metal forming the second metal layer is smaller than electrical resistance of a metal forming the first metal layer.

14. The energy storage device according to claim 12, wherein the first metal layer includes the through hole, wherein the flange portion includes a convex part protruding in the penetrating direction, and wherein the convex part is disposed between a peripheral edge of the through hole and a peripheral edge of the swaged portion in a direction orthogonal to the penetrating direction.

15. The energy storage device according to claim 12, wherein the second metal layer includes a peripheral end surface that is an end surface in the direction orthogonal to the penetrating direction, and wherein the first metal layer includes a cover portion protruding in the penetrating direction, the cover portion protruding along the peripheral end surface of the second metal layer.

16. The energy storage device according to claim 12, wherein the external terminal is a negative electrode, the first metal layer contains aluminum or an aluminum-based metal, and wherein the second metal layer contains copper or a copper-based metal.

17. The energy storage device according to claim 12, wherein a thickness of the first metal layer disposed between the enlarged diameter portion and the swaged portion is smaller than a thickness of the second metal layer disposed between the enlarged diameter portion and the swaged portion in the penetrating direction.

18. An energy storage device comprising:

an electrode assembly;

a case that houses the electrode assembly; and a metal external terminal disposed in the case and welded to a busbar member, wherein the external terminal includes:

a flange portion spreading along an outer surface of the case outside the case; and a shaft portion extending from the flange portion, penetrating the case, and conductively connected to the electrode assembly, wherein the flange portion is formed of a clad material including a plurality of metal layers stacked in a penetrating direction of the shaft portion, and includes a through hole through which the shaft portion is inserted, wherein the shaft portion includes:

an enlarged diameter portion that is formed between the flange portion and the outer surface of the case and spreads along the outer surface of the case, and a swaged portion that spreads along a surface of the flange portion on a side opposite to the case and sandwiches a peripheral edge portion of the through hole in the flange portion between the swaged portion and the enlarged diameter portion, wherein a first metal layer that is a metal layer opposite to the case in the penetrating direction among the plurality of metal layers includes:

a concave part recessed in the penetrating direction or a through hole penetrating in the penetrating direction in a region that is larger than the swaged portion when viewed from the penetrating direction and includes the swaged portion when viewed from the penetrating direction, and a welding surface welded to the busbar member, which is a surface opposite to the case in the penetrating direction, wherein a second metal layer that is a metal layer facing the case in the penetrating direction among the plurality of metal layers includes a through hole through which the shaft portion is inserted, wherein the first metal layer contains aluminum or an aluminum-based metal, wherein the second metal layer contains copper or a copper-based metal, wherein the surface of the swaged portion on the side opposite the case is positioned farther from the case than the surface of the flange portion on the side opposite the case in the penetrating direction, wherein the surface of the swaged portion on the side opposite the case is not welded to the flange portion, wherein the flange portion includes a convex part protruding in the penetrating direction in the concave part of the first metal layer, and wherein the convex part is disposed entirely within the concave part such that the convex part does not extend onto the welding surface.

* * * * *